United States Patent
Detert et al.

(10) Patent No.: US 9,049,085 B2
(45) Date of Patent: Jun. 2, 2015

(54) METHOD AND A DEVICE FOR DETERMINING AN EXTRINSIC INFORMATION

(75) Inventors: Thorben Detert, Munich (DE); Mikhail Volyanskiy, Augsburg (DE)

(73) Assignee: ROHDE & SCHWARZ GMBH & CO. KG, Munich (DE)

(*) Notice: Subject to any disclaimer, the term of this patent is extended or adjusted under 35 U.S.C. 154(b) by 0 days.

(21) Appl. No.: 14/009,007

(22) PCT Filed: Mar. 5, 2012

(86) PCT No.: PCT/EP2012/053723
§ 371 (c)(1),
(2), (4) Date: May 12, 2014

(87) PCT Pub. No.: WO2012/130559
PCT Pub. Date: Oct. 4, 2012

(65) Prior Publication Data
US 2014/0294122 A1    Oct. 2, 2014

(30) Foreign Application Priority Data

Mar. 31, 2011   (DE) .......................... 10 2011 006 565
Jul. 4, 2011    (DE) .......................... 10 2011 078 565

(51) Int. Cl.
| | |
|---|---|
| H03D 3/22 | (2006.01) |
| H04L 27/20 | (2006.01) |
| H04L 25/03 | (2006.01) |
| H04L 25/06 | (2006.01) |
| H04L 27/233 | (2006.01) |

(52) U.S. Cl.
CPC ........ *H04L 27/201* (2013.01); *H04L 25/03171* (2013.01); *H04L 25/067* (2013.01); *H04L 27/2331* (2013.01)

(58) Field of Classification Search
None
See application file for complete search history.

(56) References Cited

U.S. PATENT DOCUMENTS

2013/0294551 A1*  11/2013  Sikri ............................ 375/341

FOREIGN PATENT DOCUMENTS

| | | |
|---|---|---|
| DE | 602 15 127 T2 | 3/2007 |
| DE | 10 2006 029 464 A1 | 6/2007 |
| DE | 10 2007 056 726 A1 | 10/2008 |
| DE | 601 32 179 T2 | 12/2008 |

(Continued)

OTHER PUBLICATIONS

J. Proakis, "Digital Communications," Jan. 1, 2011, McGraw-Hill, New York, XP002676571, ISBN: 0-07-232111-3, pp. 242-243, Equation 5.1-40.

(Continued)

*Primary Examiner* — Adolf Dsouza
(74) *Attorney, Agent, or Firm* — Ditthavong & Steiner, P.C.

(57) ABSTRACT

A device for detecting an estimated value for a symbol at a given time, which is supplied to a phase modulation and transmitted via a transmission channel with a time-variable phase, provides a unit for determining log weighting factors in a forward recursion, a unit for determining complex coefficients in a forward recursion, a unit for determining log weighting factors in a backward recursion, a unit for determining complex coefficients in a backward recursion, a unit for determining an extrinsic information, a unit for determining the phase factor with the maximal weighting factor in a forward recursion and a unit for determining the phase factor with the maximal weighting factor in a backward recursion.

19 Claims, 2 Drawing Sheets

(56) References Cited

FOREIGN PATENT DOCUMENTS

| DE | 10 2007 060 015 A1 | 4/2009 |
|----|---|---|
| DE | 10 2010 06 0520 A1 | 7/2011 |
| EP | 1 932 307 B1 | 1/2009 |
| GB | 2 400 000 A | 9/2004 |
| WO | 2007/039205 A1 | 4/2007 |
| WO | 2008/125205 A1 | 10/2008 |

OTHER PUBLICATIONS

A. Barbieri et al., "Soft-Output Decoding of Rotationally Invariant Codes Over Channels with Phase Noise," IEEE Transactions on Communications, IEEE Service Center, Piscataway, NJ, U.S.A., vol. 55, No. 11, Nov. 1, 2007, pp. 2125-2133, XP011197218, ISSN: 0090-6778, DOI: 10.1109/Tcomm.2007.908520, Section III, Subsection IVB, Equation 30.

G. Ferrari et al., "On Linear Predictive Detection for Communications with Phase Noise and Frequency Offset," IEEE Transactions on Vehicular Technology, IEEE Service Center, Piscataway, NJ, U.S.A., vol. 56, No. 4, Jul. 1, 2007, pp. 2073-2085, P011187970, ISSN: 0018-9545; DOI: 10.1109/TVT.2007.897190, Subsection IIE, Equation 28.

International Search Report for International Application No. PCT/JP2012/053723, date of mailing Jun. 6, 2012, 4 pages.

Written Opinion and International Preliminary Report on Patentability for PCT/EP2012/053723 issued Oct. 2, 2013 (8 pages).

\* cited by examiner

METHOD AND A DEVICE FOR DETERMINING AN EXTRINSIC INFORMATION

CROSS-REFERENCE TO RELATED APPLICATION

The present application is a national phase application of PCT Application No. PCT/EP2012/053723, filed on Mar. 5, 2012, and claims priority to German Application No. 10 2011 006 565.2, filed on Mar. 31, 2011, and German Application No. 10 2011 078 565.5, filed on Jul. 4, 2011, the entire contents of which are herein incorporated by reference.

BACKGROUND OF THE INVENTION

1. Field of the Invention

The invention relates to a method and a device for determining an extrinsic information.

2. Discussion of the Background

To allow an exact detection of Phase-Shift-Keying (PSK) modulated symbols in a transmission channel of which the phase transmission behavior is time-variable because of phase noise, pilot symbols are transmitted for an estimation of the transmission function of the transmission channel characterizing the time-variable phase-transmission behavior. If a transmission in short blocks is provided and if an estimation of the phase-transmission behavior is required in every block, a coherent detection of this kind impairs the transmission efficiency to a considerable extent and accordingly fails.

In the case of a non-coherent detection of a PSK-modulated symbol, especially a differential PSK-modulated symbol, there is no transmission of pilot symbols. Instead, probability distributions of the phase of the transmission channel are additionally determined in the detection alongside estimated values for the individual transmitted PSK-modulated symbols, which leads to an increase in the complexity of the detection. Barbieri, A. et al. "Soft-Output Decoding of Rotationally Invariant Codes Over Channels with Phase Noise", IEEE Transactions on Communications, Volume 55, No. 11, November 2007, pages 2125 to 2133, describes a recursive detection method which presents a non-coherent detection of differentially M-PSK-modulated symbols.

This detection method is disadvantageously characterized by a plurality of additions, multiplications and divisions, which impair the detection of PSK modulated symbols in real-time. Moreover, this detection method is characterized by a wide dynamic range of the values to be calculated, which makes a fixed-point implementation more difficult.

SUMMARY OF THE INVENTION

Embodiments of the invention therefore advantageously develop a method and a device for real-time-compatible detection of differentially phase-modulated symbols in a transmission channel subject to phase noise.

Accordingly, for every symbol time and every symbol hypothesis, an associated extrinsic information is determined, which results from the relationship of the a-posteriori probability for the respective symbol hypothesis at the respective symbol time with a given sequence of sampled values of the received signal and the a-priori probability for the respective symbol hypothesis.

The a-posteriori probability for the respective symbol hypothesis with a known sequence of sampled values of the received signal also provides a dependence upon the a-posteriori probability of the phase of the transmission channel with a known sequence of sampled values of the received signal and assuming a positive, real, coded symbol. The probability density of the phase of the transmission channel at a given time with a known sequence of sampled values of the received signal from the beginning of the sequence up to the given time and assuming a positive, real, coded symbol is approximated as the sum of Tikhonov distributions weighted respectively with a weighting factor and dependent respectively upon a complex coefficient and the phase of the transmission channel. By analogy, the probability density of the phase of the transmission channel at the given time with a known sequence of sampled values of the received signal from the given time to the end of the received sequence and with the assumption of a positive, real, coded symbol is approximated as the sum of Tikhonov distributions weighted respectively with a weighting factor and dependent respectively upon a complex coefficient and upon the phase of the transmission channel.

With this approximation of the probability density of the phase of the transmission channel, a recursive solution which can therefore be transferred into industrial practice to determine the extrinsic information for the respective symbol hypothesis is obtained. The disadvantage still associated with this approximation solution of a plurality of additions, multiplications and divisions to be implemented, which has hitherto stood in the way of real-time-compatible implementation, is removed by the determination according to the invention of a log extrinsic information. Moreover, the logging of the extrinsic information leads to a reduction in the signal modulation and accordingly to a dynamic reduction. With a fixed-point implementation, an efficient implementation of the method according to the invention is therefore achieved.

The logging of the extrinsic information leads to a calculation formula for the extrinsic information, in which log weighting factors and complex coefficients of the Tikhonov distribution occur, which are determined respectively in a recursion running in a positive time direction, referred to below as a forward recursion, and a recursion running in a negative time direction, referred to below as a backward recursion.

While in the case of the recursive calculation of the complex coefficient of the Tikhonov distribution for a given symbol time with a forward recursion, the symbol received at the same symbol time is preferably additively linked to the complex coefficient of the Tikhonov distribution determined for the preceding symbol time, in the case of a backward recursion, the symbol received at the same symbol time is preferably additively linked to the complex coefficient of the Tikhonov distribution determined for the following symbol time.

With the recursive calculation of the log weighting factor of the Tikhonov distribution for a given symbol time in the case of a forward recursion, the so-called Jacobi-logarithm is determined from the previously known log a-priori probability for all of the symbol hypotheses to be investigated for the same symbol time and the log weighting factors of the Tikhonov distribution for the preceding symbol time, and in the case of a backward recursion, the Jacobi-logarithm is determined from the previously known log a-priori probability for all symbol hypotheses to be investigated for the following symbol time and the log weighting factors of the Tikhonov distribution for the following symbol time.

In a preferred first variant, the Jacobi-logarithm is calculated accurately by adding a maximal-value function and a correction function, and, in a second variant, it is approximated by ignoring the correction function.

The connection between the recursion of the complex coefficient of the Tikhonov distribution determined for a given symbol time and the recursion of the log weighting factor of the Tikhonov distribution determined for a given symbol time is implemented by adding a complex coefficient of the Tikhonov distribution determined for the same symbol time to the result of the Jacobi-logarithm. Accordingly, in the case of the previously implemented calculation of the complex coefficient of the Tikhonov distribution determined for the same symbol time, with a forward recursion, the complex coefficient of the Tikhonov distribution for the preceding symbol time, or respectively, with a backward recursion, the complex coefficient for the Tikhonov distribution for the following symbol time is preferably multiplied by a phase term corresponding to a possible symbol hypothesis of the PSK-modulation used. By preference, the modulus of the complex coefficient of the Tikhonov distribution is added to the result of the Jacobi logarithm.

In each case, the complex coefficient of the Tikhonov distribution used for the calculation of the log extrinsic information and determined respectively in a forward or respectively a backward recursion is preferably that complex coefficient of the Tikhonov distribution for the recursive calculation of which the complex coefficient of the Tikhonov distribution determined for the preceding symbol time (in the case of a forward recursion), or respectively, the complex coefficient of the Tikhonov distribution determined for the following symbol time (in the case of a backward recursion) is multiplied respectively by a phase term, of which the phase factor corresponds to the phase factor of the respective maximal log weighting factor of the Tikhonov distribution for the same symbol time.

Through the logging according to the invention of the extrinsic information, multiplications occurring in the individual recursion formulae are replaced with less calculation-intensive additions.

Through the preferred introduction of the Jacobi-logarithm into the recursion formulae of the weighting factors of the Tikhonov distribution and into the calculation formulae of the extrinsic information, a logarithmic summation of exponential functions which is very costly to implement is advantageously avoided.

The preferred determination of the phase factor in the phase term associated with every symbol hypothesis at which the log weighting factor of the Tikhonov distribution becomes maximal, reduces the summation occurring in the recursion formulae for the determination of the complex coefficients of the Tikhonov distribution to a significantly simpler calculation of a single summand instead of a cost-intensive division.

The calculation of the extrinsic information is preferably implemented through Jacobi logging of the log weighting factors determined respectively in the forward recursion and in the backward recursion of the Tikhonov distribution, taking into consideration the complex coefficients of the Tikhonov distribution determined respectively in the forward recursion and in the backward recursion.

BRIEF DESCRIPTION OF THE DRAWINGS

The device according to the invention and the method according to the invention for determining an extrinsic information are explained in detail below with reference to the drawings. The figures of the drawings are as follows.

DETAILED DESCRIPTION OF EXEMPLARY EMBODIMENTS OF THE INVENTION

Figure 1:
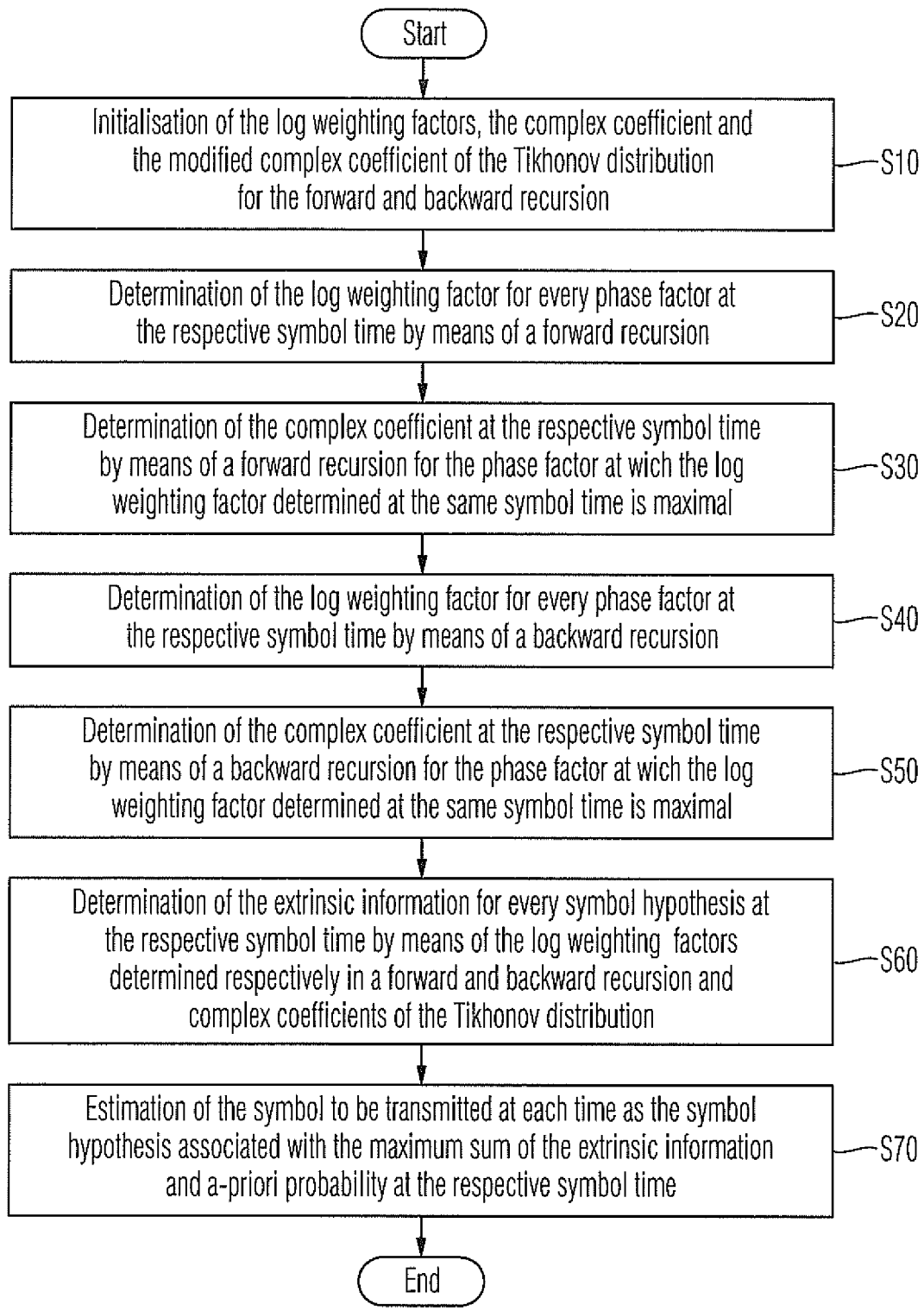
FIG. 1 shows a flow diagram of the method according to the invention for determining an extrinsic information.
Figure 2:
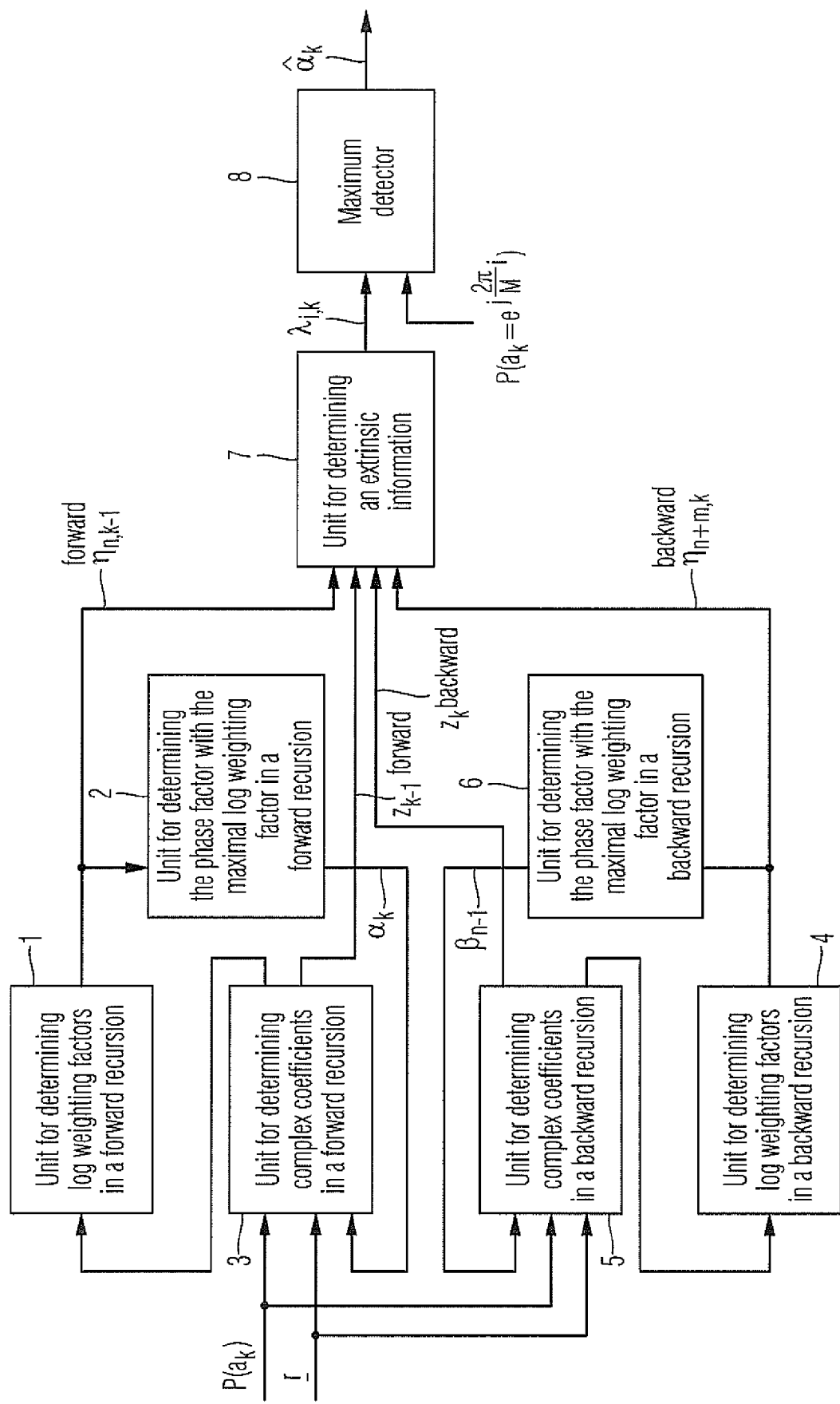
FIG. 2 shows a block-circuit diagram of the device according to the invention for determining an extrinsic information.

Before the method according to embodiments of the invention for determining an extrinsic information is described in greater detail with reference to the flow diagram in FIG. 1, and the device for determining an extrinsic information is described in greater detail with reference to the block-circuit diagram in FIG. 2, the mathematical basis required to understand the invention will be derived in the following section.

The following section considers a transmission system in which, at individual symbol times $k=1, \ldots, K$, data symbols $a_k$ to be transmitted which satisfy the symbol alphabet of a multi-value Phase-Shift-Keying (PSK) according to equation (1), are subjected to a differential M-PSK modulation according to equation (2). The coded symbols $c_k$ generated in this manner at the individual symbol times $k=1, \ldots, K$ also satisfy the symbol alphabet of an M-PSK modulation according to equation (3).

$$a_k \in \{e^{j\frac{2\pi}{M}m}, m = 0, \ldots, M-1\} \text{ for } k = 1, \ldots, K \quad (1)$$

$$c_k = c_{k-1} \cdot a_k \quad (2)$$

$$c_k \in \{e^{j\frac{2\pi}{M}m}, m = 0, \ldots, M-1\} \text{ for } k = 0, \ldots, K \quad (3)$$

The coded symbols $c_k$ generated by means of a differential M-PSK modulation are transmitted on a non-frequency-selective transmission channel with an approximately constant amplification factor which provides a phase noise and an additive Gaussian noise.

The phase noise is modelled through a time-variable phase $\theta_k$. The time behavior of the time-variable phase $\theta_k$ corresponds to the mathematical relationship in equation (4), The phase increment $\Delta_k$ in equation (4) satisfies a real Gaussian distribution and provides a mean value of zero and a standard deviation $\sigma_\Delta$. The phase $\theta_0$ at the symbol time zero is distributed over the phase range between zero and $2\pi$ corresponding to a uniform distribution. While the standard deviation $\sigma_\Delta$ of the phase increment $\Delta_k$ is determined through measurement and/or simulation and is therefore known to the receiver, the sequence of the individual phase increments $\Delta_k$ is not known to the receiver and is statistically independent of the additive Gaussian noise $v_k$ and of the coded symbol $c_k$.

The additive Gaussian noise, which corresponds to a complex, additive, white, Gaussian noise (Additive White Gaussian Noise (AWGN) with a mean value of zero and a variance $N_0=2\sigma^2$, is described by the noise term $v_k$. Any existing real amplification factor of the transmission channel is taken into consideration by standardization of the variance of the additive Gaussian noise.

$$\theta_{k-1} = \theta_k + \Delta_k \text{ for } k=0, \ldots, K \quad (4)$$

The sampled value of the received signal $r_k$ after the matched filtering is obtained according to equation (5).

$$r_k = c_k \cdot e^{j\theta_k} + v_k \text{ for } k=0, \ldots, K \quad (5)$$

In the following section, the detection method according to the invention is derived on the basis of the Maximum A-Priori (MAP) symbol detection algorithm. In order to estimate the sequence $a=\{a_k\}_{k=1}^K$ of symbols to be transmitted independently of one another in the case of an unknown sequence $\theta=\{\theta_k\}_{k=0}^{K}$ of mutually independent phase values of the transmitted signal, in the case of an unknown) sequence $c=\{c_k\}_{k=1}^{K}$ of coded symbols dependent upon one another because of the differential modulation and in the case of a known sequence $r=\{r_k\}_{k=0}^{K}$ of sampled values of the received signal, the conditional probability density $p(a,c,\theta|r)$ for the simultaneous occurrence of a given sequence a of symbols to be transmitted, a given sequence $\theta$ of phase values of the transmission channel and a given sequence c of coded symbols with a known and therefore given sequence r of sampled values of the received signal must be determined with a MAP-algorithm.

This conditional probability density $p(a,c,\theta|r)$ can be mathematically converted according to equation (6) using the general relationship for a conditional probability or respectively conditional probability density according to equation (7). The probability density $p(r)$ for the occurrence of the sequence r of sampled values of the received signal occurring in this context is identical for all possible values of the sequences a and c; it can therefore be ignored. On the basis of the discrete value range of the sequences a and c according to equation (6), the probability density $p(a,c,\theta,r)$ can be broken down into a probability $P(a,c)$ and a conditional probability density $p(r,\theta|a,c)$. Since the sequence c of coded symbols is dependent upon the sequence a of symbols to be transmitted, the probability $P(a,c)$ can be converted into the mathematical relationship $P(a,c)=P(a)\cdot P(c|a)$. Since the sequence r of sampled values of the received signal not only a dependence upon the sequences a and c, but also a dependence upon the sequence $\theta$, the probability density $p(r,\theta|a,c)$ can be converted into the mathematical relationship $p(r,\theta|a,c)=p(r|\theta,a,c)\cdot p(\theta|a,c)$.

Since the sequence $\theta$ of phase values of the transmission channel is independent of the sequence a of symbols to be transmitted and of the sequence c of coded symbols, the probability density $p(\theta|a,c)$ is obtained as $p(\theta|a,c)=p(\theta)$. Since the sequence r of sampled values of the received signal in the case of a given sequence c of coded symbols is independent of the sequence a of symbols to be transmitted, the probability density $p(r|\theta,a,c)$ is obtained as $p(r|\theta,a,c)=p(r|\theta,c)$. In summary, a mathematical relationship for the probability density $p(a,c,\theta|r)$ can be formulated according to the second line in equation (6).

$$p(\underline{a}, \underline{c}, \underline{\theta}|\underline{r}) = \frac{p(\underline{a}, \underline{c}, \underline{\theta}, \underline{r})}{p(\underline{r})} \propto P(\underline{a}, \underline{c}) \cdot p(\underline{r}, \underline{\theta}|\underline{a}, \underline{c}) = \qquad (6)$$
$$= P(\underline{a}) \cdot P(\underline{c}|\underline{a}) \cdot p(\underline{\theta}) \cdot p(\underline{r}|\underline{\theta}, \underline{c})$$

$$p(x|y) = \frac{p(x,y)}{p(y)} \qquad (7)$$

The probability density $p(a)$ for the occurrence of the sequence a of symbols to be transmitted is obtained according to equation (8) from the product of the probabilities for the occurrence of each individual symbol $a_k$, because, by way of mathematical simplification, an independence of the individual symbols to be transmitted relative to one another is assumed. This independence of the individual symbols to be transmitted is not always given in reality.

$$p(\underline{a}) = \prod_{k=1}^{K} p(a_k) \qquad (8)$$

The probability density $p(\theta)$ for the occurrence of the sequence $\theta$ of phase values of the transmission channel can be determined according to equation (9) on the basis of the dependence of the individual phase values relative to one another from the product of the probability density $p(\theta_0)$ for the occurrence of the phase value $\theta_0$ at the symbol time zero and the probability densities $p(\theta_k|\theta_{k-1})$ for the occurrence of the phase value $\theta_k$ at the symbol time k on the condition that the phase value $\theta_{k-1}$ is known for the preceding symbol time k−1.

$$p(\underline{\theta}) = p(\theta_0) \cdot \prod_{k=1}^{K} p(\theta_k|\theta_{k-1}) \qquad (9)$$

The probability density $p(c|a)$ for the occurrence of the sequence c of coded symbols subject to the condition that the sequence a of symbols to be transmitted is known at the same time, is obtained according to equation (10) from the product of the probability density $p(c_0)$ for the occurrence of the coded symbol $c_0$ at the symbol time zero and the indicator function $I(c_k,c_{k-1},a_k)$ associated respectively with each coded symbol $c_k$, which, in the presence of the coding condition according to equation (2), provides the value one and otherwise provides the value zero.

$$p(\underline{c}|\underline{a}) = p(c_0) \cdot \prod_{k=1}^{K} I(c_k, c_{k-1}, a_k) \qquad (10)$$

The probability density $p(r|c,\theta)$ for the occurrence of the sequence r of sampled values of the received signal subject to the condition that the sequence c of coded symbols and the sequence $\theta$ of phase values of the transmission channel are known at the same time, can be presented according to equation (11) through the product of the probability densities $p(r_k|c_0,\theta_k)$ for the occurrence of each individual sample value of the received signal $r_k$ at the individual symbol times k subject to the condition that the coded symbol $c_k$ and the phase value $\theta_k$ of the transmission channel at the individual symbol times k are known at the same time. The probability density $p(r_k|c_k,\theta_k)$ for the occurrence of each individual sample value of the received signal $r_k$ at the individual symbol times k subject to the condition that the coded symbol $c_k$ and the phase value $\theta_k$ of the transmission channel at the individual symbol times k are known at the same time, is given in the MAP algorithm according to equation (12) as a Gaussian distribution of the sampled value of the received signal $r_k$ at the symbol time k with the product of the coded symbol $c_k$ at the symbol time k and the phase term with the known phase value $\theta_k$ at the symbol time k as the mean value.

$$p(\underline{r}|\underline{c}, \underline{\theta}) = \prod_{k=0}^{K} p(r_k|c_k, \theta_k) \qquad (11)$$

$$p(r_k|c_k, \theta_k) = \frac{1}{2\pi\sigma^2} \exp\left(-\frac{|r_k - c_k \cdot e^{j\theta_k}|^2}{2\sigma^2}\right) \qquad (12)$$

Taking into consideration equations (8), (9), (10) and (11), starting from equation (6), a relationship for the conditional probability density p(a,c,θ|r) is obtained according to equation (13).

$$p(\underline{a}, \underline{c}, \underline{\theta} | \underline{r}) = \prod_{k=1}^{K} p(a_k) \cdot p(c_0) \qquad (13)$$

$$\prod_{k=1}^{K} I(c_k, c_{k-1}, a_k) \cdot p(\theta_0) \cdot \prod_{k=1}^{K} p(\theta_k | \theta_{k-1}) \cdot \prod_{k=1}^{K} p(r_k | c_k, \theta_k)$$

This equation (13) describes the probability density for the occurrence of several unknown sequences, namely the sequence a of symbols to be transmitted, the sequence c of coded symbols and the sequence θ of phase values of the transmission channel, subject to the condition of a known sequence r of sampled values of the received signal. A conversion of this mathematical formula for the probability density with regard to a determination of the symbol $$a_k = e^{j\frac{2\pi}{M}m}$$

respectively transmitted at each symbol time k is technically too complicated in this form because of the plurality of probability densities linked multiplicatively to one another, which have to be calculated for each sequence a of symbols to be transmitted, for each sequence c of coded symbols and for each sequence θ of phase values of the transmission channel.

One solution to this problem is to separate the overall transmission procedure into a total of three time portions, namely one time portion from symbol time zero (the start of the individual sequences) up to the symbol time k−1, one time portion from the symbol time k−1 up to the symbol time k and one time portion from the symbol time k up to the symbol time K at the end of the individual sequences.

In the time portion from symbol time k−1 to symbol time k, the symbol $a_k$ to be transmitted according to equation (2) at symbol time k acts, via the coded symbol $c_{k-1}$, at the symbol time k−1 directly on the coded symbol $c_k$ at the symbol time k. Moreover, according to equation (5), the coded symbol $c_k$, at the symbol time k−1 and the phase value $\theta_{k-1}$ of the transmission channel at the symbol time k−1 has a direct effect on the sampled value of the received signal $r_{k-1}$ at the symbol time k−1, or respectively, the coded symbol $c_k$ at the symbol time k and the phase value $\theta_k$ of the transmission channel at the symbol time k has a direct effect on the sampled value of the received signal $r_k$ at the symbol time k. Finally, the phase value $\theta_{k-1}$ of the transmission channel at the symbol time k−1 acts, according to equation (4), directly on the phase value $\theta_k$ of the transmission channel at the symbol time k.

A parameter which characterizes the probability for the occurrence of the symbol $$a_k = e^{j\frac{2\pi}{M}i}$$

to be transmitted at the symbol time k, is the extrinsic information $\epsilon_{i,k}$ for the symbol $a_k$ to be transmitted at the symbol time k, which is defined as the ratio of the a-posteriori probability P($a_k$|r) of the symbol $a_k$ to be transmitted at the symbol time k in the case of a known sequence r of received symbols and the a-priori probability P($a_k$) of the symbol $a_k$ to be transmitted at the symbol time k.

In order to determine the extrinsic information $$\varepsilon_{i,k} = \frac{P\left(a_k = e^{j\frac{2\pi}{M}i} \mid r\right)}{P\left(a_k = e^{j\frac{2\pi}{M}i}\right)}$$

for the symbol $a_k$ to be transmitted at the symbol time k, for all hypotheses of the coded symbol $c_{k-1}$ and of the phase value $\theta_{k-1}$ of the transmission channel at the symbol time k−1, in the case of a known sequence $r_0^{k-1}$ of sampled values of the received signal from the symbol time 0 to the symbol time k−1 and in the case of a known sequence $r_k^K$ of sampled values of the received signal from the symbol time k to the symbol time K, the associated probabilities of the above-named relationships are summated.

For this purpose, according to equation (14), the probability densities p($c_{k-1}$,$\theta_{k-1}$|$r_0^{k-1}$) for the occurrence of the coded symbol $c_{k-1}$ and of the phase value $\theta_{k-1}$ of the transmission channel at the symbol time k−1 in the case of a known sequence $r_0^{k-1}$ of sampled values of the received signal from the symbol time 0 to the symbol time k−1, the probability densities p($c_k$=$c_{k-1}$·$a_k$,$\theta_k$|$r_k^K$) for the occurrence of the coded symbol $c_k$ and of the phase value $\theta_k$ of the transmission channel at the symbol time k in the case of a known sequence $r_k^K$ of sampled values of the received signal from the symbol time k to the symbol time K and the probability densities p($\theta_k$|$\theta_{k-1}$) for the phase value $\theta_k$ of the transmission channel at the symbol time k in the case of a known phase value $\theta_{k-1}$ of the transmission channel at the symbol time k−1 are multiplied with one another and summated for all hypotheses of the coded symbol $c_{k-1}$ at the symbol time k−1 and integrated over all hypotheses of the phase value $\theta_{k-1}$ of the transmission channel at the symbol time k−1 and of the phase value $\theta_k$ of the transmission channel at the symbol time k.

$$\varepsilon_{i,k} = \frac{P\left(a_k = e^{j\frac{2\pi}{M}i} \mid r\right)}{P\left(a_k = e^{j\frac{2\pi}{M}i}\right)} \propto \qquad (14)$$

$$\sum_{c_{k-1}} \int \int p(c_{k-1}, \theta_{k-1} | r_0^{k-1}) \cdot p(c_k = c_{k-1} \cdot a_k, \theta_k | r_k^K) \cdot$$

$$p(\theta_k | \theta_{k-1}) d\theta_k d\theta_{k-1}$$

The probability density p($c_{k-1}$,$\theta_{k-1}$|$r_0^{k-1}$) for the occurrence of the coded symbol $c_{k-1}$ and of the phase value $\theta_{k-1}$ of the transmission channel at the symbol time k−1 in the case of a known sequence $r_0^{k-1}$ of sampled values of the received signal from the symbol time 0 to the symbol time k−1 can be determined for the time portion from symbol time 0 to the symbol time k−1 within the framework of a forward recursion.

In order to determine a recursion formula for a forward recursion of this kind in the recursion step between the symbol times k−1 and k, the probabilities or respectively probability densities of all relationships according to equation (2), (4) and (5), which are present at the symbol times k−1 and k and between the symbol times k−1 and k, are determined:

The probability densities p($c_k$,$\theta_k$|$r_0^k$) for the occurrence of the coded symbol $c_k$ and of the phase value $\theta_k$ of the transmission channel at the symbol time k in the case of a known sequence $r_0^k$ of sampled values of the received signal from the symbol time 0 to the symbol time k, The probability density $p(c_{k-1},\theta_{k-1}|r_0^{k-1})$ for the occurrence of the coded symbol $c_{k-1}$ and of the phase value $\theta_{k-1}$ of the transmission channel at the symbol time k−1 in the case of a known sequence $r_0^{k-1}$ of sampled values of the received signal from the symbol time 0 to the symbol time k−1, The probability density $p(r_k|c_k,\theta_k)$ for the occurrence of the sample value of the received signal $r_k$ at the symbol time k in the case of a known coded symbol $c_k$ and a known phase value $\theta_k$ of the transmission channel at the symbol time k, The a-priori probability $P(a_k)$ for the symbol $a_k$ to be transmitted at the symbol time k and The probability density $p(\theta_k|\theta_{k-1})$ for the phase value $\theta_k$ of the transmission channel at the symbol time k in the case of a known phase value $\theta_{k-1}$ of the transmission channel at the symbol time k−1.

The probability density $p(c_k,\theta_k|r_0^k)$ for the occurrence of the coded symbol $c_k$ and of the phase value $\theta_k$ of the transmission channel at the symbol time k in the case of a known sequence $r_0^k$ of sampled values of the received signal from the symbol time 0 to the symbol time k is obtained according to equation (15) within the framework of a forward recursion starting from the probability density $p(c_{k-1},\theta_{k-1}|r_0^{k-1})$ for the occurrence of the coded symbol $c_{k-1}$ and of the phase value $\theta_{k-1}$ of the transmission channel at the symbol time k−1 in the case of a known sequence $r_0^k$ of sampled values of the received signal from the symbol time 0 to the symbol time k by means of a multiplication by the remaining determined probabilities followed by a summation of all hypotheses for the symbol $a_k$ to be transmitted at the symbol time k and integration over all hypotheses of the phase value $\theta_{k-1}$ of the transmission channel at the symbol time k−1.

$$p(c_k,\theta_k|r_0^k) = p(r_k|c_k,\theta_k) \cdot \prod_{i=0}^{M-1} P\left(a_k = e^{j\frac{2\pi}{M}i}\right) \cdot \int p(c_{k-1} = c_k \cdot a_k *, \theta_{k-1}|r_0^{k-1}) \cdot p(\theta_k|\theta_{k-1}) d\theta_{k-1} \quad (15)$$

The probability density $p(c_k,\theta_k|r_k^K)$ for the occurrence of the coded symbol $c_k$ and of the phase value $\theta_k$ of the transmission channel at the symbol time k in the case of a known sequence $r_k^K$ of sampled values of the received signal from the symbol time k to the symbol time K can be determined for the time portion from the symbol time k to the symbol time K within the framework of a backward recursion.

In order to determine recursion formula for a backward recursion of this kind in the recursion step between the symbol times k−1 and k, the probabilities or respectively probability densities of all relationships according to equations (2), (4) and (5), which are present at the symbol times k−1 and k and between the symbol times k−1 and k, are determined:

The probability density $p(c_{k-1},\theta_{k-1}|r_{k-1}^K)$ for the occurrence of the coded symbol $c_{k-1}$ and of the phase value $\theta_{k-1}$ of the transmission channel at the symbol time k−1 in the case of a known sequence $r_{k-1}^K$ of sampled values of the received signal from the symbol time k−1 to the symbol time K, The probability density $p(c_k,\theta_k|r_k^K)$ for the occurrence of the coded symbol $c_k$ and of the phase value $\theta_k$ of the transmission channel at the symbol time k in the case of a sequence $r_k^K$ of sampled values of the received signal from the symbol time k to the symbol time K, The probability density $p(r_{k-1}|c_{k-1},\theta_{k-1})$ for the occurrence of the sampled value of the received signal $r_{k-1}$ at the symbol time k−1 in the case of a known coded symbol $c_{k-1}$ and a known phase value $\theta_{k-1}$ of the transmission channel at the symbol time k−1, The a-priori probability $P(a_k)$ for the symbol $a_k$ to be transmitted at the symbol time k and The probability density $p(\theta_k|\theta_{k-1})$ for the phase value $\theta_k$ of the transmission channel at the symbol time k in the case of a known phase value $\theta_{k-1}$ of the transmission channel at the symbol time k−1.

The probability density $p(c_{k-1},\theta_{k-1}|r_{k-1}^K)$ for the occurrence of the coded symbol $c_{k-1}$ and of the phase value $\theta_{k-1}$ of the transmission channel at the symbol time k−1 in the case of a known sequence $r_{k-1}^K$ of sampled values of the received signal from the symbol time k−1 to the symbol time K is obtained according to equation (16) in the framework of a backward recursion starting from the probability density $p(c_k,\theta_k|r_k^K)$ for the occurrence of the coded symbol $c_k$ and of the phase value $\theta_k$ of the transmission channel at the symbol time k in the case of a known sequence $r_k^K$ of sampled values of the received signal from the symbol time k to the symbol time by means of a multiplication by the remaining determined probabilities or respectively probability densities followed by a summation of all hypotheses of the symbol $a_k$ to be transmitted at the symbol time k and an integration of all hypotheses of the phase value $\theta_k$ of the transmission channel at the symbol time k.

$$p(c_{k-1},\theta_{k-1}|r_{k-1}^K) = p(r_{k-1}|c_{k-1},\theta_{k-1}) \cdot \sum_{i=0}^{M-1} P\left(a_k = e^{j\frac{2\pi}{M}i}\right) \cdot \int p(c_k = c_{k-1} \cdot a_k, \theta_k|r_k^K) \cdot p(\theta_k|\theta_{k-1}) d\theta_k \quad (16)$$

The probability density $p(c_{k-1},\theta_{k-1}|r_0^{k-1})$ for the occurrence of the coded symbol $c_{k-1}$ and of the phase value $\theta_{k-1}$ of the transmission channel at the symbol time k−1 in the case of a known sequence $r_0^{k-1}$ of sampled values of the received signal from the symbol time 0 to the symbol time k−1 can be converted according to equation (17) taking into consideration the intermediate values $x=\theta_k$ and $y=c_k+r_0^k$.

$$p(c_k,\theta_k|r_0^k) = p(\theta_k|c_k,r_0^k) \cdot p(c_k|r_0^k) \quad (17)$$

With reference to the documents cited above, the following properties additionally apply:

I. $p(c_k|r_0^k) = const.$ and $p(c_k|r_k^K) = const.$ \quad (18)

II. $p\left(\theta_k|c_k = e^{j\frac{2\pi}{M}i}, r_0^k\right) = p\left(\theta_k + \frac{2\pi}{M}i \middle| c_k = e^{j0}, r_0^k\right)$ \quad (19)

III. The summation of all hypotheses of the coded symbol $c_{k-1}$ at the symbol time k−1 in equation (14) disappears, because all M summands are identical.

In particular, with regard to properties I and II, it is the case that within the framework of the forward recursion, only the probability density $\psi_k(\theta_k) = p(\theta_k|c_k=1,r_0^k)$, and within the framework of the backward recursion, only the probability density $\omega_k(\theta_k) = p(\theta_k|c_k=1,r_k^K)$ must be calculated. Accordingly, starting from equations (15), (17) and (19), the simplified calculation formula for the probability density $\psi_k(\theta_k)$ at the symbol time k is obtained in the forward recursion according to equation (20), and starting from equations (16) and (17), the simplified calculation formula for the probability density $\omega_{k-1}(\theta_k)$ at the preceding symbol time k−1 in the backward recursion is obtained according to equation (21).

$$\psi_k(\theta_k) = p(r_k \mid c_k = 1, \theta_k) \cdot \sum_{i=0}^{M-1} P\left(a_k = e^{j\frac{2\pi}{M}i}\right) \int \psi_{k-1}\left(\theta_{k-1} - \frac{2\pi}{M}i\right) \cdot p(\theta_k \mid \theta_{k-1}) d\theta_{k-1} \quad (20)$$

$$\omega_{k-1}(\theta_{k-1}) = p(r_{k-1} \mid c_{k-1} = 1, \theta_{k-1}) \cdot \sum_{i=0}^{M-1} p\left(a_k = e^{j\frac{2\pi}{M}i}\right) \int \omega_k\left(\theta_k + \frac{2\pi}{M}i\right) \cdot p(\theta_k \mid \theta_{k-1}) d\theta_k \quad (21)$$

For the extrinsic information, the relationship according to equation (22) applies, starting from equation (14) and taking into consideration property III and equation (19).

$$\varepsilon_{i,k} = \frac{P\left(a_k = e^{j\frac{2\pi}{M}i} \mid r\right)}{P\left(a_k = e^{j\frac{2\pi}{M}i}\right)} = \int\int \psi_{k-1}(\theta_{k-1}) \cdot \omega_k\left(\theta_k + \frac{2\pi}{M}i\right) \cdot p(\theta_k \mid \theta_{k-1}) d\theta_k d\theta_{k-1} \quad (22)$$

This simplified forward-backward recursion presented in equations (20), (21) and (22) including calculation of the extrinsic information contains the continuous probability-density functions $\psi_k(\theta_k)=p(\theta_k|c_k=1,r_0^k)$, $\omega_k(\theta_k)=p(\theta_k|c_k=1,r_k^K)$, $p(r_k|c_k=1,\theta_k)$, $p(r_{k-1}|c_{k-1}=1,\theta_{k-1})$ and $p(\theta_k|\theta_{k-1})$, as well as integrations of these continuous probability-density functions, which make a direct conversion into an implementation capable of execution in a computer more difficult.

A simplification of this problem is achieved by approximating the probability-density functions $\psi_k(\theta_k)=p(\theta_k|c_k=1,r_0^k)$ and $\omega_k(\theta_k)=p(\theta_k|c_k=1,r_k^K)$ according to equation (23) and (24) as sums of respectively M Tikhonov distributions t(.) weighted with a real weighting factor $q_{m,k}^{forward}$ and respectively $q_{m,k}^{backward}$. The factor M corresponds to the valence of the symbol alphabet of the PSK modulation used.

$$\psi_k(\theta_k) = \sum_{m=0}^{M-1} q_{m,k}^{forward} \cdot t\left(z_k^{forward} \cdot e^{j\frac{2\pi}{M}m}; \theta_k\right) \quad (23)$$

$$\omega_k(\theta_k) = \sum_{m=0}^{M-1} q_{m,k}^{backward} \cdot t\left(z_k^{backward} \cdot e^{j\frac{2\pi}{M}m}; \theta_k\right) \quad (24)$$

The respective Tikhonov distribution is dependent upon a complex factor $z_k^{forward}$ and respectively $z_k^{backward}$ and upon the phase value $\theta_k$ at the symbol time k and is obtained from equation (25). It contains the modified, first-order Bessel function $I_0$.

$$t(z; \theta) = \frac{e^{Re\{z \cdot e^{-j\theta}\}}}{2\pi I_0(|z|)} \quad (25)$$

The probability density $\omega_k(\theta_k)$ in the forward recursion is obtained starting from equation (20) taking into consideration a Tikhonov distribution for the probability density $\omega_k(\theta_k)$ according to equation (23) as a relationship according to equation (26). In this context, a Gaussian distribution according to equation (12) is used for the probability density $p(r_k|c_k,\theta_k)$ for the sampled value of the received signal $r_k$ at the symbol time k in the case of a known coded symbol $c_k$ and a known phase value $\theta_k$ of the transmission channel at the symbol time k in the forward recursion in equation (20), and in this context, all exponential function terms are ignored, which do not provide a dependence upon the phase value $\theta_k$ and which accordingly represent constant terms with regard to the probability density $\psi_k(\theta_k)$. For the probability density $p(\theta_k|\theta_{k-1})$ for the phase value $\theta_k$ of the transmission channel at the symbol time k in the case of a known phase value $\theta_{k-1}$ of the transmission channel at the symbol time k−1, a Gaussian distribution of the mean value $\theta_{k-1}$ and variance $\sigma_\Delta^2$ is assumed, because the characteristic of the individual phase increments $\Delta_k$ in equation (4) provides a Gaussian distribution with mean value zero and variance $\sigma_\Delta^2$. Additionally, all multiplicative factors which do not provide a dependence upon the phase value $\theta_k$ are ignored.

$$\psi_k(\theta_k) = e^{\frac{1}{\sigma^2} \cdot Re\{r_k \cdot e^{-j\theta_k}\}} \cdot \sum_{i=0}^{M-1} p\left(a_k = e^{j\frac{2\pi}{M}i}\right) \int \sum_{m=0}^{M-1} q_{m,k-1}^{forward} \cdot t\left(z_{k-1}^{forward} \cdot e^{j\frac{2\pi}{M}m}; \theta_{k-1} - \frac{2\pi}{M}i\right) \cdot g(\theta_{k-1}, \sigma_\Delta^2; \theta_k) d\theta_k \quad (26)$$

For the convolution of the Tikhonov distribution t(.) with the Gaussian distribution in equation (26), the approximation (27) can be used. With the introduction of this approximation, the mathematical relationship for the probability density $\psi_k(\theta_k)$ in the forward recursion according to equation (26) is converted into equation (29) with the introduction of the modified complex coefficient $z'^{forward}_{m,k}$ of the Tikhonov distribution t(.) according to equation (28).

$$\int t(z; \theta) \cdot g(\bar{\theta}, \sigma_\Delta^2; \theta) d\theta \approx t\left(\frac{z}{1 + \sigma_\Delta^2 \cdot |z|}; \theta\right) \quad (27)$$

$$z'^{forward}_{k-1} = \frac{z_{k-1}^{forward}}{1 + \sigma_\Delta^2 \cdot |z_{k-1}^{forward}|} \quad (28)$$

$$\psi_k(\theta_k) = e^{\frac{1}{\sigma^2} \cdot Re\{r_k \cdot e^{-j\theta_k}\}} \cdot \sum_{i=0}^{M-1} \sum_{m=0}^{M-1} P\left(a_k = e^{j\frac{2\pi}{M}i}\right) q_{m,k-1}^{forward} \cdot t\left(z'^{forward}_{k-1}; \theta_k - \frac{2\pi}{M}(m+i)\right) \quad (29)$$

The Bessel function $I_0(.)$ used in the Tikhonov distribution t(.) can be approximated for large arguments through an exponential function. The mathematical relationship in equation (30) therefore follows from equation (25).

$$e^{Re\{z \cdot e^{-j\theta}\}} \approx 2\pi \cdot e^{|z|} \cdot t(z; \theta) \quad (30)$$

Through the use of the mathematical relationship in equation (30) and through substitution of the running indices i and m with the new running index n=i+m, the mathematical relationship for the probability density $\psi_k(\theta_k)$ in the forward recursion in equation (29) is converted into the mathematical relationship in equation (31).

$$\psi_k(\theta_k) = e^{\frac{1}{\sigma^2} \cdot \text{Re}\{r_k \cdot e^{-j\theta_k}\}} \quad (31)$$

$$\sum_{n=0}^{M-1} \sum_{i=0}^{M-1} P\left(a_k = e^{j\frac{2\pi}{M}i}\right) \cdot q_{(n-i)\text{Mod }M, k-1}^{forward} \cdot e^{\left|z_{k-1}^{\prime forward} \cdot e^{j\frac{2\pi}{M}n} + \frac{r_k}{\sigma^2}\right|} \cdot .$$

$$t\left(z_{k-1}^{\prime forward} \cdot e^{j\frac{2\pi}{M}n} + \frac{r_k}{\sigma^2}; \theta_k\right)$$

A comparison of the mathematical relationship for the probability density $\psi_k(\theta_k)$ in equation (31) and in equation (23) gives a mathematical recursion formula for the calculation of the real weighting factor $q_{m,k}^{forward}$ of the Tikhonov distribution t(.) according to equation (32) and for the calculation of the complex coefficient $z_k^{forward}$ of the Tikhonov distribution t(.) according to equation (33). In this context, the running index n has been replaced by the running index m. For the determination of the mathematical relationship in equation (33), the approximation in equation (34) has been taken into consideration.

$$q_{m,k}^{forward} = \quad (32)$$

$$\sum_{i=0}^{M-1} P\left(a_k = e^{j\frac{2\pi}{M}i}\right) \cdot \tilde{q}_{(m-i)\text{Mod }M, k-1}^{forward} \cdot e^{\left|z_{k-1}^{\prime forward} \cdot e^{j\frac{2\pi}{M}m} + \frac{r_k}{\sigma^2}\right|}$$

for $m = 0, \ldots, M-1$ $$z_k^{forward} = z_{k-1}^{\prime forward} + \frac{r_k}{\sigma^2} \sum_{m=0}^{M-1} \tilde{q}_{m,k}^{forward} \cdot e^{j\frac{2\pi}{M}m} \quad (33)$$

$$\sum_m q_m \cdot t\left(z \cdot e^{j\frac{2\pi}{M}m} + \frac{r_k}{\sigma^2}; \theta\right) \approx \sum_m q_m \cdot t\left(w \cdot e^{j\frac{2\pi}{M}m}; \theta\right) \quad (34)$$

with $$w = z + \sum_m \frac{r_k}{\sigma^2} \cdot q_m \cdot e^{-j\frac{2\pi}{M}m}$$

Before the implementation of the forward recursion for the determination of the complex coefficient $z_k^{forward}$ of the Tikhonov distribution t(.), the real weighting factors $q_{m,k}^{forward}$ of the Tikhonov distribution t(.) must be standardized according to equation (35) so that, in sum, they result in the value 1.

$$\tilde{q}_{m,k}^{forward} = \frac{q_{m,k}^{forward}}{\sum_{m=0}^{M-1} q_{m,k}^{forward}} \quad (35)$$

A value according to equation (36) is used as the starting value for the forward recursion for the determination of the complex coefficient $z_k^{forward}$ of the Tikhonov distribution t(.), and a value according to equation (37) is used for the determination of the real weighting factor $q_{m,k}^{forward}$ of the Tikhonov distribution t(.).

$$z_0^{forward} = \frac{r_k}{\sigma^2} \quad (36)$$

$$q_{m,0}^{forward} = \delta_m = \begin{cases} 1 & m = 0 \\ 0 & m \neq 0 \end{cases} \quad (37)$$

By analogy, a recursion formula according to equation (38) can be derived for the backward recursion of the complex coefficient $z_{k-1}^{backward}$ of the Tikhonov distribution t(.), and a recursion formula according to equation (39) can be derived for the backward recursion of the real weighting factor $q_{m,k}^{backward}$ of the Tikhonov distribution t(.).

$$q_{m,k-1}^{backward} = \sum_{i=0}^{M-1} P\left(a_k = e^{j\frac{2\pi}{M}i}\right) \cdot q_{(m+i)\text{Mod }M,k}^{backward} \cdot e^{\left|z_k^{\prime backward} \cdot e^{j\frac{2\pi}{M}m} + \frac{r_{k-1}}{\sigma^2}\right|} \quad (38)$$

for $m = 0, \ldots, M-1$ $$z_{k-1}^{backward} = z_k^{\prime backward} + \frac{r_{k-1}}{\sigma^2} \sum_{m=0}^{M-1} \tilde{q}_{m,k-1}^{backward} \cdot e^{-j\frac{2\pi}{M}m} \quad (39)$$

The standardization of the weighting factors $q_{m,k}^{backward}$ of the Tikhonov distribution t(.) determined in the backward recursion is obtained according to equation (40). The starting value $z_K^{backward}$ for the backward recursion of the complex coefficient $z_k^{backward}$ of the Tikhonov distribution t(.) is obtained according to equation (41), and the starting value $q_{m,K}^{backward}$ of the real weighting factor $q_{m,k}^{backward}$ of the Tikhonov distribution t(.) is obtained according to equation (42).

$$\tilde{q}_{m,k}^{backward} = \frac{q_{m,k}^{backward}}{\sum_{m=0}^{M-1} q_{m,k}^{backward}} \quad (40)$$

$$z_K^{backward} = \frac{r_K}{\sigma^2} \quad (41)$$

$$q_{m,K}^{backward} = \delta_m = \begin{cases} 1 & m = 0 \\ 0 & m \neq 0 \end{cases} \quad (42)$$

To determine the extrinsic information according to equation (43), the mathematical relationships for the probability density $\psi_k(\theta_k)$ in the forward recursion according to equation (23) and for the probability density $\omega_k(\theta_k)$ in the backward recursion according to equation (24) are introduced into the equation (22) of the extrinsic information. In this context, it should be noted that the probability density $p(\theta_k|\theta_{k-1})$ for the phase value $\theta_k$ of the transmission channel at the symbol time k in the case of a known phase value $\theta_{k-1}$ of the transmission channel at the symbol time k−1 satisfies a Gaussian distribution with the mean value $\theta_{k-1}$ and the variance $\sigma_\Delta^2$.

$$\varepsilon_{i,k} = \frac{P\left(a_k = e^{j\frac{2\pi}{M}i} \mid r\right)}{P\left(a_k = e^{j\frac{2\pi}{M}i}\right)} = \quad (43)$$

$$\sum_m \sum_l \tilde{q}_{m,k-1}^{forward} \cdot \tilde{q}_{l,k}^{backward} \int t\left(z_k^{backward} \cdot e^{j\frac{2\pi}{M}i}; \theta_k + \frac{2\pi}{M}i\right) \cdot$$

$$\int t\left(z_{k-1}^{forward} \cdot e^{j\frac{2\pi}{M}m}; \theta_{k-1}\right) \cdot g(\theta_{k-1}, \sigma_\Delta^2; \theta_k) d\theta_k d\theta_{k-1}$$

Using the approximation for the convolution of a Tikhonov distribution with a Gaussian distribution according to approximation (27) and with the introduction of the modified complex coefficient $z'_{m,k}^{forward}$ for the Tikhonov distribution according to equation (28), the equation (43) can be converted into an approximation, which is approximated by equation (44).

$$\varepsilon_{i,k} = \frac{P\left(a_k = e^{j\frac{2\pi}{M}i} \mid r\right)}{P\left(a_k = e^{j\frac{2\pi}{M}i}\right)} = \sum_m \sum_l \tilde{q}_{m,k-1}^{forward} \cdot \tilde{q}_{l,k}^{forward} \qquad (44)$$

$$\int t\left(z_k^{backward} \cdot e^{j\frac{2\pi}{M}l}; \theta_k + \frac{2\pi}{M}i\right) \cdot t\left(z_{k-1}^{\prime forward} \cdot e^{j\frac{2\pi}{M}m}; \theta_k\right) d\theta_k$$

The two Tikhonov distribution functions in equation (44) are each presented according to their definition equation (25). While the first-order Bessel functions occurring in this context are placed before the integral because they provide no dependence upon the phase value $\theta_k$, the exponential functions occurring in this context are combined to form a single exponential function, which is, once again, described according to the definition equation (25) with a Tikhonov distribution function and a first-order Bessel function. Accordingly, with the introduction of the intermediate value $$\tau(k,l,i,m) = z_k^{backward} \cdot e^{j\frac{2\pi}{M}l} \cdot e^{-j\frac{2\pi}{M}i} + z_{k-1}^{\prime forward} \cdot e^{j\frac{2\pi}{M}m},$$

a mathematical relationship according to equation (45) is obtained from the mathematical relationship for the extrinsic information in equation (44).

$$\varepsilon_{i,k} = \frac{P\left(a_k = e^{j\frac{2\pi}{M}i} \mid r\right)}{P\left(a_k = e^{j\frac{2\pi}{M}i}\right)} = \frac{2\pi}{4\pi \cdot I_0(|z_k^{backward}|) \cdot I_0(|z_{k-1}^{\prime forward}|)} \cdot \qquad (45)$$

$$\sum_m \sum_l \tilde{q}_{m,k-1}^{forward} \cdot \tilde{q}_{l,k}^{backward} \cdot I_0(|\tau(k,l,i,m)|) \cdot \int t(\tau(k,l,i,m)) d\theta_k$$

The integral of the phase value $\theta_k$ in equation (45) results in the value 1. The Bessel functions in the denominator of equation (45) provide no dependences upon the running indices m and l and therefore represent irrelevant multiplicative terms, which are no longer considered. The final mathematical relationship for the extrinsic information is therefore obtained according to equation (46).

$$\varepsilon_{i,k} = \frac{P\left(a_k = e^{j\frac{2\pi}{M}i} \mid r\right)}{P\left(a_k = e^{j\frac{2\pi}{M}i}\right)} = \qquad (46)$$

$$\sum_m \sum_l \tilde{q}_{m,k-1}^{forward} \cdot \tilde{q}_{l,k}^{backward} \cdot I_0\left(\left|z_{k-1}^{\prime forward} + z_k^{backward} \cdot e^{j\frac{2\pi}{M}(l-m-i)}\right|\right)$$

In order to reduce the plurality of summations and multiplications in the recursion formulae of the equations (32), (33), (35), (38), (39) and (40) and in equation (46) for the calculation of the extrinsic information, and in order to limit the value range with regard to a signal-dynamic reduction, the following section will show how an algorithmic simplification can be achieved with reference to the example of the forward recursion. For this purpose, the weighting factor $q_{m,k}^{forward}$ of the Tikhonov distribution t(.) determined in the forward recursion is logged according to equation (32). The log weighting factor $\eta_{m,k}^{forward}$ of the Tikhonov distribution t(.) provided in this manner is obtained according to equation (47).

$$\eta_{m,k}^{forward} = \qquad (47)$$

$$\ln(q_{m,k}^{forward}) = \ln\left(\sum_{i=0}^{M-1} e^{\left(\gamma_{i,k} + \tilde{\eta}_{(m-i)ModM,k-1}^{forward}\right)}\right) + \left|z_{k-1}^{\prime forward} \cdot e^{j\frac{2\pi}{M}m} + \frac{r_k}{\sigma^2}\right|$$

In this context, the intermediate value $\gamma_{i,k}$ according to equation (48) is introduced as the natural log of the a-priori probability of the symbol hypothesis i for the symbol $a_k$ to be transmitted at the symbol time k and the intermediate value $\tilde{\eta}_{m,k}^{forward}$ according to equation (49) is introduced as the log, standardized, weighting factor $\ln(\tilde{q}_{m,k}^{forward})$ of the Tikhonov distribution t(.) determined in the forward recursion.

According to equation (49), the log, standardized weighting factor $\ln(\tilde{q}_{m,k}^{forward})$ of the Tikhonov distribution t(.) determined in the forward recursion can be regarded, starting from equation (35) for the standardization of the weighting factor $q_{m,k}^{forward}$ of the Tikhonov distribution t(.) determined in the forward recursion, as the difference between the log-non-standardized weighting factor $q_{m,k}^{forward}$ of the Tikhonov distribution t(.) determined in the forward recursion and the factor $C_k^{forward}$ constant with regard to the phase factor m according to equation (50).

$$\gamma_{i,k} = \ln\left(P\left(a_k = e^{j\frac{2\pi}{M}i}\right)\right) \qquad (48)$$

$$\tilde{\eta}_{m,k}^{forward} = \ln(\tilde{q}_{m,k}^{forward}) = \eta_{m,k}^{forward} - C_k^{forward} \qquad (49)$$

$$C_k^{forward} = \ln\left(\sum_{m=0}^{M-1} e^{\eta_{m,k}^{forward}}\right) \qquad (50)$$

The Jacobi-logarithm according to equation (51) is introduced to simplify the mathematical relationship in equation (47), $$\ln(e^{x1} + e^{x2}) = \max\{x_1, x_2\} + \ln(1 + e^{-|x1+x2|}) \qquad (51)$$

The Jacobi-logarithm can be regarded according to equation (52) as a modified maximal-value function $\max^*\{x_1, x_2\}$, which modifies a maximal-value function $\max\{x_1, x_2\}$ by a correction function $g(x_1, x_2) = \ln(1 + e^{-|x_1, x_2|})$.

$$\max^*\{x_1, x_2\} = \max\{x_1, x_2\} + g(x_1, x_2) \qquad (52)$$

Starting from equation (52), the modified maximal-value function $\max^*\{.\}$ can be determined iteratively for a larger number of arguments from the modified maximal-value function $\max^*\{.\}$ for a number of arguments $x_1, x_2, \ldots, x_{n-1}$ reduced by the last argument.

$$\max^*\{x_1, x_2, \ldots, x_n\} = \max^*\{\max^*\{x_1, x_2, \ldots, x_{n-1}\}, x_n\} \qquad (53)$$

However, the Jacobi-logarithm can also be determined approximately according to equation (54), without calculating the correction function $g(.)$.

$$\ln(e^{x1} + e^{x2} + \ldots + e^{xn}) = \max_2^*\{x_1, x_2, \ldots, x_n\} \approx \max\{x_1, x_2, \ldots, x_n\} \qquad (54)$$

The introduction of the Jacobi-logarithm into the mathematical relationship for the log weighting factor $\eta_{m,k}^{forward}$ in the forward recursion according to equation (47) in combination with equation (49) achieves a simplification according to equation (55). In this context, the constant $C_k^{forward}$ can be ignored, because it provides no dependence upon the phase factor m.

$$\eta_{m,k}^{forward} = \ln(q_{m,k}^{forward}) = \max_{i} * \quad (55)$$

$$\left\{ \gamma_{i,k} + \tilde{\eta}_{(m-i)ModM,k-1)}^{forward} - C_k^{forward} \right\} + + \left| z_{k-1}^{\prime forward} \cdot e^{j\frac{2\pi}{M}m} + \frac{r_k}{\sigma^2} \right|$$

In order to avoid the standardization of the weighting factors in the forward recursion according to equation (35) and in the backward recursion according to equation (40), each of which contains a calculation-intensive division and summation, a determination of the maximal value is implemented instead of a standardization. For this purpose, according to equation (56), the phase factor $\tilde{m}_k$ of the log weighting factor $\eta_{m,k}^{forward}$ of the Tikhonov distribution t(.) determined in the forward recursion is determined at the symbol time k which is maximal.

$$\tilde{m}_k = \operatorname*{argmax}_{m}\{\eta_{m,k}^{forward}\} \quad (56)$$

With the use of exclusively the maximal weighting factor $\max\{q_{0,k}^{forward}, \ldots, q_{M-1,k}^{forward}\}$ of the Tikhonov distribution t(.) determined in the forward recursion, the recursion formula for determining the complex coefficient $z_k^{forward}$ of the Tikhonov distribution t(.) determined in the forward recursion according to equation (33) is simplified into a simplified recursion formula according to equation (57). In equation (57), the identity illustrated in equation (58) is used to create a connection between the recursion formula for calculating the weighting factor and the complex coefficient of the Tikhonov distribution t(.).

$$z_k^{forward} \approx z_{k-1}^{\prime forward} + \frac{r_k}{\sigma^2} \cdot e^{-j\frac{2\pi}{M}\tilde{m}_k^{forward}} \quad (57)$$

$$\left| z_{k-1}^{\prime forward} + \frac{r_k}{\sigma^2} \cdot e^{-j\frac{2\pi}{M}\tilde{m}_k^{forward}} \right| = \left| z_{k-1}^{\prime forward} \cdot e^{j\frac{2\pi}{M}\tilde{m}_k^{forward}} + \frac{r_k}{\sigma^2} \right| \quad (58)$$

To simplify the calculation formula for the extrinsic information, the new phase factor n=(l–m)mod M is introduced into equation (46). The calculation formula for the extrinsic information is thus obtained according to equation (59).

$$\varepsilon_{i,k} = \frac{P\left(a_k = e^{j\frac{2\pi}{M}i} \mid r\right)}{P\left(a_k = e^{j\frac{2\pi}{M}i}\right)} = \sum_n \sum_m \tilde{q}_{mmodM,k-1}^{forward} \cdot \quad (59)$$

$$\tilde{q}_{(n+m)modM,k}^{backward} \cdot \cdot I_0\left(\left| z_{k-1}^{\prime forward} + z_k^{backward} \cdot e^{j\frac{2\pi}{M}(n-i)} \right|\right) ==$$

$$\sum_n I_0\left(\left| z_{k-1}^{\prime forward} + z_k^{backward} \cdot e^{j\frac{2\pi}{M}(n-i)} \right|\right) \cdot$$

$$\sum_m \tilde{q}_{mmodM,k-1}^{forward} \cdot \tilde{q}_{(n+m)modM,k}^{backward}$$

Starting from equation (59), a logging of the extrinsic information and an approximation of the first-order Bessel function through an exponential function leads to the mathematical relationship for the log, extrinsic information $\lambda_{i,k}$ in equation (60).

$$\lambda_{i,k} = \ln\left(\frac{P\left(a_k = e^{j\frac{2\pi}{M}i} \mid r\right)}{P\left(a_k = e^{j\frac{2\pi}{M}i}\right)}\right) = \max_n * \quad (60)$$

$$\left\{ \left| z_{k-1}^{\prime forward} + z_k^{backward} \cdot e^{j\frac{2\pi}{M}(n-i)} \right| + \max_m * \{\eta_{m,k-1}^{forward} + \eta_{n+m,k}^{backward}\} \right\}$$

With the introduction of the maximal log weighting factor $f_{n,k}$ determined in forward and backward recursion at the symbol time k and for the phase factor n according to equation (61) and of the intermediate value $\mu_{n-i,k}$ at the symbol time k and for the phase factor n–i according to equation (62), the log extrinsic information $\lambda_{i,k}$ is obtained, starting from equation (60), according to equation (63).

$$f_{n,k} = \max_m * \{\eta_{m,k-1}^{forward} + \eta_{n+m,k}^{backward}\} \quad (61)$$

for
$n = 0, \ldots, M - 1$
and
$k = 1, \ldots, K$ $$\mu_{n-i,k} = \left| z_{k-1}^{\prime forward} + z_k^{backward} \cdot e^{j\frac{2\pi}{M}(n-i)} \right| \quad (62)$$

for
$n = 0, \ldots, M - 1$
and
$k = 1, \ldots, K$ $$\lambda_{i,k} = \max_n * \{\mu_{n-i,k} + f_{n,k}\} \quad (63)$$

for
$i = 0, \ldots, M - 1$,
$n = 0, \ldots, M - 1$
and
$k = 1, \ldots, K$

Starting from equation (62), the introduction of the modified phase factor v=n–i leads to the calculation formula for the intermediate value $\mu_{v,k}$ according to equation (64) and, starting from equation (63), to the calculation formula for the log extrinsic information $\lambda_{i,k}$ according to equation (65).

$$\mu_{v,k} = \left| z_{k-1}^{\prime forward} + z_k^{backward} \cdot e^{j\frac{2\pi}{M}v} \right| \quad (64)$$

for
$v = 0, \ldots, M - 1$
and
$k = 1, \ldots, K$ $$\lambda_{i,k} = \max_v * \{\mu_{v,k} + f_{v+i,k}\} \quad (65)$$

for
$i = 0, \ldots, M - 1$,
$v = 0, \ldots, M - 1$
and
$k = 0, \ldots, K - 1$

In summary, the following calculation formula is obtained for the simplified detection algorithm of a differential M-PSK modulated signal:

For the forward recursion, the starting value $\tilde{\eta}_{m,0}^{forward}$ of the log, standardized weight factor $\tilde{\eta}_{m,k}^{forward}$ of the Tikhonov distribution t(.) at the symbol time zero can be determined according to equation (66), the starting value $z_0^{forward}$ of the complex coefficient $z_k^{forward}$ of the Tikhonov distribution t(.) at the symbol time zero can be determined according to equation (67), and the starting value $z'_0^{forward}$ of the modified complex coefficient $z'_k^{forward}$ of the Tikhonov distribution t(.) at the symbol time zero can be determined according to equation (68).

$$\tilde{\eta}_{m,0}^{forward} = \begin{cases} 0 & m = 0 \\ -\infty & m \neq 0 \end{cases} \quad \text{for} \quad (66)$$

$$z_0^{forward} = \frac{r_0}{\sigma^2} \quad (67)$$

$$z'_0^{forward} = \frac{z_0^{forward}}{1 + \sigma_\Delta^2 \cdot |z_0^{forward}|} \quad (68)$$

The log weighting factor $\eta_{m,k}^{forward}$ determined in a forward recursion at the symbol time k is obtained according to equation (69) taking into consideration equations (70) and (71), which form the connection to the forward recursion of the complex coefficient of the Tikhonov distribution t(.).

$$\eta_{m,k}^{forward} = \max_{i}{}^*_{1(2)} \{\gamma_{i,k} + \eta_{(m-i)ModM,k-1}^{forward}\} + \xi_{m,k}^{forward} \quad (69)$$

for
$m = 0, \ldots, M-1,$
$i = 0, \ldots, M-1$
and
$k = 1, \ldots, K-1$ $$\xi_{m,k}^{forward} = |\rho_{m,k}^{forward}| \quad (70)$$

for
$m = 0, \ldots, M-1$
and
$k = 1, \ldots, K-1$ $$\rho_{m,k}^{forward} = z_{k-1}^{forward} + \frac{r_k}{\sigma^2} \cdot e^{-j\frac{2\pi}{M}m} \quad (71)$$

for
$m = 0, \ldots, M-1$
and
$k = 1, \ldots, K-1$

According to equation (72), the complex coefficient $z_k^{forward}$ of the Tikhonov distribution t(.) at the symbol time k determined in a forward recursion is obtained starting from the result of equation (71) as the intermediate value $$\rho_{\alpha_k,k}^{forward}$$

in brie case of phase factor $\alpha_k$ at the symbol time k, which corresponds, according to equation (73), to the phase factor m of the maximal weighting factor $$\max_{m} \{\eta_{m,k}^{forward}\}$$

of the Tikhonov distribution t(.) at the symbol time k determined in a forward recursion. The modified complex coefficient $z'_k^{forward}$ of the Tikhonov distribution t(.) at the symbol time k determined in a forward recursion is obtained according to equation (74).

$$z_k^{forward} = \rho_{\alpha_k,k}^{forward} \quad \text{for } k = 0, \ldots, K-1 \quad (72)$$

$$\alpha_k = \text{argmax}_{m} \{\eta_{m,k}^{forward}\} \quad \text{for } k = 0, \ldots, K-1 \quad (73)$$

$$z'_k^{forward} = \frac{z_k^{forward}}{1 + \sigma_\Delta^2 \cdot |z_k^{forward}|} \quad \text{for } k = 0, \ldots, K-1 \quad (74)$$

For the backward recursion, the starting value $\tilde{\eta}_{m,K}^{backward}$ of the log, standardized weighting factor $\tilde{\eta}_{m,k}^{backward}$ of the Tikhonov distribution t(.) at the symbol time K can be determined according to equation (75), the starting value $z_K^{backward}$ of the complex coefficient $z_k^{backward}$ of the Tikhonov distribution t(.) at the symbol time K can be determined according to equation (76), and the starting value $z'_K^{backward}$ of the modified complex coefficient $z'_k^{backward}$ of the Tikhonov distribution t(.) at the symbol time K can be determined according to equation (77).

$$\tilde{\eta}_{m,K}^{backward} = \begin{cases} 0 & m = 0 \\ -\infty & m \neq 0 \end{cases} \quad \text{for} \quad (75)$$

$$z_K^{backward} = \frac{r_K}{\sigma^2} \quad (76)$$

$$z'_K^{backward} = \frac{z_K^{backward}}{1 + \sigma_\Delta^2 \cdot |z_K^{backward}|} \quad (77)$$

The log weighting factor $\eta_{m,k-1}^{backward}$ at the symbol time k−1 determined in a forward recursion is obtained according to equation (78) taking into consideration equations (79) and (80), which form the connection to the backward recursion of the complex coefficient of the Tikhonov distribution t(.).

$$\eta_{m,k-1}^{backward} = \max_{i}{}^*_{1(2)} \{\gamma_{i,k} + \eta_{(m+i)ModM,k}^{backward}\} + \xi_{m,k-1}^{backward} \quad (78)$$

for $m = 0, \ldots, M-1$ and $k = 0, \ldots, K-1$ $$\xi_{m,k-1}^{backward} = |\rho_{m,k-1}^{backward}| \quad (79)$$

for $m = 0, \ldots, M-1$ and $k = 0, \ldots, K-1$ $$\rho_{m,k-1}^{backward} = z_k^{backward} + \frac{r_{k-1}}{\sigma^2} \cdot e^{-j\frac{2\pi}{M}m} \quad (80)$$

for $m = 0, \ldots, M-1$ and $k = 0, \ldots, K-1$

According to equation (81) the complex coefficient $z_{k-1}^{backward}$ of the Tikhonov distribution t(.) at the symbol time k−1 determined in a backward recursion is determined starting from the result of equation (80) as the intermediate value $\rho_{\beta_k,k-1}^{backward}$ at the symbol time k−1 with the phase factor $\beta_{k-1}$ at the symbol time k−1, which corresponds according to equation (82) to the phase factor m of the maximal weighting factor $$\max_{m} \{\eta_{m,k-1}^{backward}\}$$

of the Tikhonov distribution t(.) at the symbol time k−1 determined in a backward recursion. The modified complex coefficient $z'_{k-1}^{backward}$ of the Tikhonov distribution t(.) at the symbol time k−1 determined in a backward recursion is obtained according to equation (83).

$$z'^{backward}_{k-1} = \rho^{backward}_{\beta_k, k-1} \text{ for } k = 0, \ldots, K-1 \quad (81)$$

$$\beta_{k-1} = \underset{m}{\operatorname{argmax}} \{\eta^{backward}_{m,k-1}\} \text{ for } k = 0, \ldots, K-1 \quad (82)$$

$$z'^{backward}_k = \frac{z^{backward}_k}{1 + \sigma^2_\Delta \cdot |z^{backward}_k|} \text{ for } k = 0, \ldots, K-1 \quad (83)$$

The extrinsic information can be calculated according to equations (61), (62) and (65).

In the following section, the method according to the invention for determining an extrinsic information is explained in detail on the basis of the flowchart in FIG. 1 and the device according to the invention for determining an extrinsic information is explained in detail on the basis of the block-circuit diagram in FIG. 2.

In the first method step S10, the individual recursion variables are initialised. This takes place on the basis of equation (65) for the total of M log, standardized weighting factors $\tilde{\eta}_{m,0}^{forward}$ of the Tikhonov distribution t(.) determined in a forward recursion at the symbol time zero, on the basis of equation (67) for the complex coefficient $z_0^{forward}$ of the Tikhonov distribution t(.) determined in a forward recursion at the symbol time zero, on the basis of equation (68) for the modified complex coefficient $z'^{forward}_k$ of the Tikhonov distribution t(.) determined in a forward recursion at the symbol time zero, on the basis of equation (75) for the total of M log, standardized weighting factors $\tilde{\eta}_{m,K}^{backward}$ of the Tikhonov distribution t(.) at the symbol time K, on the basis of equation (76) for the complex coefficient $z_K^{backward}$ of the Tikhonov distribution t(.) determined in a backward recursion and on the basis of equation (77) for the modified complex coefficient $z'^{backward}_K$ of the Tikhonov distribution t(.) determined in a backward recursion.

In the next method step S20, in a unit 1 for determining log weighting factors in a forward recursion, the total of M log weighting factors $\eta_{m,k}^{forward}$ of the Tikhonov distribution t(.) determined in a forward recursion are determined for the respective symbol time k on the basis of the recursion formula according to equation (69). For this purpose, the Jacobi-logarithm is calculated from the individual sums of the a-priori probability $\gamma_{i,k}$ associated respectively with each symbol hypothesis i at the respective symbol time k and of log weighting factor n forward $\eta_{(m-i) \bmod M, k-1}^{forward}$ the Tikhonov distribution t(.) at the preceding symbol time k−1. The modulus of the intermediate value $\rho_{m,k}^{forward}$ determined at the same symbol time k−1 in the unit 2 for determining complex coefficients in a forward recursion is added to the Jacobi-logarithm, which is composed, according to equation (71), of the modified, complex coefficient $z'^{forward}_{k-1}$ of the Tikhonov distribution t(.) at the preceding symbol time k−1 determined in a forward recursion and the received symbol $r_k$ at the symbol time k, and which is additionally buffered for further processing in the following method step S30 in an intermediate buffer, which is not illustrated in FIG. 2.

As the Jacobi-logarithm, the variant $\max_1^*\{.\}$ of the Jacobi-logarithm composed of the maximal-value function $\max\{.\}$ and the correction function $g(.)$ can be used according to equation (52), or alternatively the approximation $\max\{.\}$ consisting exclusively of the maximal-value function $\max_2^*\{.\}$ can be used according to equation (53).

In the next method step S30, in a unit 2 for determining the phase factor in the case of the maximal log weighting factor in a forward recursion according to equation (73), that phase factor $\alpha_k$ at the symbol time k is determined, which is associated with the maximal log weighting factor $$\underset{m}{\max} \{\eta_{m,k}^{forward}\}$$

of the Tikhonov distribution t(.) determined in a forward recursion at the symbol time k of all of the total of M log weighting factors $\eta_{m,k}^{forward}$ of the Tikhonov distribution t(.) at the symbol time k determined in a forward recursion.

According to equation (72), in the same method step S30, in a unit 3 for determining complex coefficients in a forward recursion, the complex coefficient $z_k^{forward}$ of the Tikhonov distribution t(.) at the symbol time k determined in a forward recursion is determined from the intermediate value $\rho_{\alpha_k,k}$ determined in equation (71) in the case of the phase factor $\alpha_k$ determined in the same method step S30. The associated modified coefficient $z'^{forward}_k$ of the Tikhonov distribution t(.) at the symbol time k determined in a forward recursion is obtained according to equation (74) from the complex coefficient $z_k^{forward}$ of the Tikhonov distribution t(.) at the symbol time k just determined in a forward recursion.

In the next method step S40, in a unit 4 for determining log weighting factors in a backward recursion, the total of M log weighting factors $\eta_{m,k-1}^{backward}$ of the Tikhonov distribution t(.) determined in a backward recursion at the respectively preceding symbol time k−1 is determined on the basis of the recursion formula according to equation (78). In this context, the Jacobi-logarithm is calculated from the individual sums of a-priori probabilities $\gamma_{i,k}$ at the respective symbol time k respectively associated with each symbol hypothesis i and of log weighting factors $\eta_{m,k}^{backward}$ of the Tikhonov distribution t(.) at the preceding symbol time k−1 determined in a backward recursion. The modulus of the intermediate value $\rho_{m,k-1}^{backward}$ determined at the same symbol time k−1 in the unit 5 for determining complex coefficients in a backward recursion is added to the Jacobi-logarithm, which is composed of the modified, complex coefficient $z'^{backward}_k$ of the Tikhonov distribution t(.) according to quotation (80) at the symbol time k determined in a backward recursion and the received symbol $r_{k-1}$ at the preceding symbol time k−1 and which is additionally buffered for further processing in the following method step S50 in an intermediate buffer, which is not illustrated in FIG. 2.

In the next method step S50, in a unit 6 for determining the phase factor in the case of the maximal log weighting factor in a backward recursion according to equation (82), that phase factor $\beta_{k-1}$ at the preceding symbol time k−1 is determined, which corresponds to the phase factor m of the maximal weighting factor $$\underset{m}{\max} \{\eta_{m,k-1}^{backward}\}$$

of all of the total of M log weighting factors $\eta_{m,k-1}$ of the Tikhonov distribution t(.) at the preceding symbol time k−1 determined in a backward recursion.

In the next method step S60, in a unit 7 for determining an extrinsic information, the log extrinsic information $\lambda_{i,k}$ associated with the symbol hypothesis i at the symbol time k according to equations (61), (62) and (63) on the basis of the total of M log weighting factors $\eta_{m,k-1}^{backward}$ of the Tikhonov distribution t(.) at the preceding symbol time k−1 determined in a forward recursion according to method step S20, the total of M log weighting factors $\eta_{m,k}^{backward}$ of the Tikhonov distribution t(.) determined in a backward recursion according to method step S40 at the symbol time k of a modified complex coefficient $z'^{backward}_{k-1}$ of the Tikhonov distribution t(.) at the preceding symbol time k−1 determined in a forward recursion according to method step S30 and of the modified complex coefficient $z'^{backward}_{k}$ of the Tikhonov distribution t(.) determined in a backward recursion according to method step S50 at the symbol time k are calculated. In this context, the Jacobi-logarithm is used in the variant $\max_1^*\{.\}$ comprising the maximal value function $\max\{.\}$ and the correction function g(.) according to equation (52) or in the variant $\max_2^*\{.\}$ comprising exclusively the maximal value function $\max\{.\}$ according to equation (53).

In the final optionally implemented method step S70, in a maximal value detector 8, the maximal a-posteriori probability $$\max_i \left\{ P\left(a_k = e^{j\frac{2\pi}{M}i} \mid \underline{r}\right) \right\}$$

is determined as the maximal sum $$\max_i \left\{ \lambda_{i,k} + P\left(a_k = e^{j\frac{2\pi}{M}i}\right) \right\}$$

of the extrinsic information $\lambda_{i,k}$ and the a-priori probability $$P\left(a_k = e^{j\frac{2\pi}{M}i}\right)$$

of all of the total of M a-posteriori probabilities $$P\left(a_k = e^{j\frac{2\pi}{M}i} \mid \underline{r}\right)$$

associated respectively with a symbol hypothesis i at the symbol time k. The symbol hypothesis i associated with this maximal a-posteriori probability $$\max_i \left\{ P\left(a_k = e^{j\frac{2\pi}{M}i} \mid \underline{r}\right) \right\}$$

represents the estimated value $\hat{a}_k$ for the symbol $a_k$ to be transmitted at the symbol time k.

The invention is not restricted to the individual embodiments and variants described. In particular, all combinations of all of the features presented and mentioned in the claims, in the description and in the figures of the drawings are also covered by the invention. Especially, all of the features of the dependent claims formulated in the independent method claims relate by analogy to the independent device claim.

The invention claimed is:

1. A method comprising:
   determining an extrinsic information for a symbol hypothesis of a symbol at a given time, which is supplied to a differential phase modulation and transmitted via a transmission channel with a time-variable phase,
   wherein an a-posteriori probability of the phase with a positive, real coded symbol and with a known sequence of sampled values of a received signal corresponds to a sum of Tikhonov distributions of the phase respectively weighted with a weighting factor and respectively dependent upon a complex coefficient,
   wherein a log extrinsic information is used as the extrinsic information for the symbol hypothesis at each time; and
   wherein a log weighting factor at a preceding time, which is determined with a recursion running in a positive time direction from the log weighting factor determined at a pre-preceding time, and a complex coefficient of the Tikhonov distribution at the preceding time, which is determined with the recursion running in the positive time direction from the complex coefficient of the Tikhonov distribution determined at the pre-preceding time, are used to determine the log extrinsic information for the symbol hypothesis at the given time.

2. The method for determining the extrinsic information according to claim 1,
   wherein the complex coefficient of the Tikhonov distribution determined at the preceding time with the recursion running in the positive time direction is determined from additive linking of the complex coefficient of the Tikhonov distribution determined at the pre-preceding time with a signal received at the preceding time determined with the recursion running in the positive time direction.

3. The method for determining the extrinsic information according to claim 2,
   wherein the log weighting factor determined at the preceding time with the recursion running in the positive time direction is determined with a Jacobi-logarithm from sums determined for each symbol hypothesis respectively from a log a-priori probability at the preceding time and the log weighting factor determined at the pre-preceding time with the recursion running in the positive time direction.

4. The method for determining the extrinsic information according to claim 2,
   wherein the log weighting factor determined at the preceding time with the recursion running in the positive direction, the complex coefficient of the Tikhonov distribution determined at the pre-preceding time with the recursion running in the positive time direction, which is weighted with a phase term of the phase modulation, and a signal received at the preceding time are linked additively.

5. The method for determining the extrinsic information according to claim 1,
   wherein the log weighting factor determined at the preceding time with the recursion running in the positive time direction is determined with a Jacobi-logarithm from sums determined for each symbol hypothesis respectively from a log a-priori probability at the preceding time and the log weighting factor determined at the pre-preceding time with the recursion running in the positive time direction.

6. The method for determining the extrinsic information according to claim 5,
   wherein the Jacobi-logarithm contains respectively a maximal value function and a correction function.

7. The method for determining the extrinsic information according to claim 5,
   wherein the Jacobi-logarithm contains respectively only a maximal value function.

8. The method for determining the extrinsic information according to claim 5,
   wherein the log weighting factor determined at the preceding time with the recursion running in the positive direction, the complex coefficient of the Tikhonov distribution determined at the pre-preceding time with the recursion running in the positive time direction, which is weighted with a phase term of the phase modulation, and a signal received at the preceding time are linked additively.

9. The method for determining the extrinsic information according to claim 1,
wherein the log weighting factor determined at the preceding time with the recursion running in the positive direction, the complex coefficient of the Tikhonov distribution determined at the pre-previous time with the recursion running in the positive time direction, which is weighted with a phase term of the phase modulation, and a symbol received at the preceding time are linked additively.

10. The method for determining the extrinsic information according to claim 1,
wherein, for determination of the complex coefficient of the Tikhonov distribution determined at the preceding time with the recursion running in the positive time direction, the complex coefficient of the Tikhonov distribution determined at the pre-preceding time with the recursion running in the positive time direction is weighted with a phase term of the phase modulation, of which a phase factor at the preceding time corresponds to that phase factor, at which the log weighting factor determined at the preceding time with the recursion running in the positive time direction is maximal.

11. The method for determining the extrinsic information according to claim 1,
wherein a log weighting factor determined by logging the weighting factor at a respective time, which is determined with a recursion running in the negative time direction from the log weighting factor determined at a following time, and the complex coefficient of the Tikhonov distribution at the respective time, which is determined with the recursion running in the negative time direction from the complex coefficient of the Tikhonov distribution determined at the following time, are used additionally for determination of the log extrinsic information for the symbol hypothesis at the given time.

12. The method for determining the extrinsic information according to claim 11,
wherein the complex coefficient of the Tikhonov distribution determined at the time with the recursion running in the negative time direction is determined from additive linking of the complex coefficient of the Tikhonov distribution determined at the following time with the recursion running in the negative time direction with a sample value of a signal received at the given time.

13. The method for determining the extrinsic information according to claim 11,
wherein the log weighting factor determined at the time with the recursion running in the negative time direction is determined with a Jacobi-logarithm for sums determined respectively for each symbol hypothesis from a log a-priori probability at the respective time and the log weighting factor determined at the respective time with the recursion running in the negative time direction.

14. The method for determining the extrinsic information according to claim 11,
wherein the complex coefficient of the Tikhonov distribution determined at the following time with the recursion running in the positive time direction, which is weighted with a phase term of the phase modulation, and a sampled value of the received signal received at the given time are additively linked to the log weighting factor determined at the respective time with the recursion running in the negative time direction.

15. The method for determining the extrinsic information according to claim 14,
wherein, for determination of the complex coefficient of the Tikhonov distribution determined at the respective time with the recursion running in the negative time direction, the complex coefficient of the Tikhonov distribution determined at the following time with the recursion running in the negative direction is weighted with the phase term of the phase modulation, of which a phase factor at the time corresponds to that phase factor, at which the log weighting factor determined at this time with the recursion running in the negative time direction is maximal.

16. The method for determining the extrinsic information according to claim 11,
wherein for the determination of the log extrinsic information for the symbol hypothesis at the time, a respectively maximal log weighting factor for each modified phase factor is determined as a Jacobi-logarithm from the sums determined respectively for each phase factor from the log weighting factor determined at the preceding time with a recursion running in the positive time direction and the log weighting factor determined at the time with a recursion running in the negative time direction.

17. The method for determining an extrinsic information according to claim 11,
wherein, for the determination of the log extrinsic information for the symbol hypothesis and at the time, a Jacobi-logarithm is determined from sums determined respectively for each modified phase factor from a respectively maximal log weighting factor for each modified phase factor and taking into consideration the complex coefficient of the Tikhonov distribution determined at the preceding time with the recursion running in the positive time direction and the complex coefficient of the Tikhonov distribution determined at the time with the recursion running in the negative time direction.

18. A computer software product especially with program-code means stored on a non-transitory machine-readable carrier for implementation of all steps according to claim 1 when the program-code means is executed on a computer or a digital signal processor.

19. A device for determining an extrinsic information for a symbol hypothesis of a symbol at a given time, which is supplied to a phase modulation and transmitted via a transmission channel with a time-variable phase, said device comprising:
a unit for determining log weighting factors in a forward recursion,
a unit for determining complex coefficients in the forward recursion,
a unit for determining the log weighting factors in a backward recursion,
a unit for determining the complex coefficients in the backward recursion,
a unit for determining the extrinsic information,
a unit for determining a phase factor with a maximal weighting factor in the forward recursion; and
a unit for determining the phase factor with the maximal weighting factor in the backward recursion;
wherein a log weighting factor at a preceding time, which is determined with a recursion running in a positive time direction from a log weighting factor determined at a pre-preceding time, and a complex coefficient of a Tikhonov distribution at the preceding time, which is determined with the recursion running in the positive time direction from the complex coefficient of the Tikhonov distribution determined at the pre-preceding time, are used to determine log extrinsic information for the symbol hypothesis at the given time.

* * * * *